Figure 1:
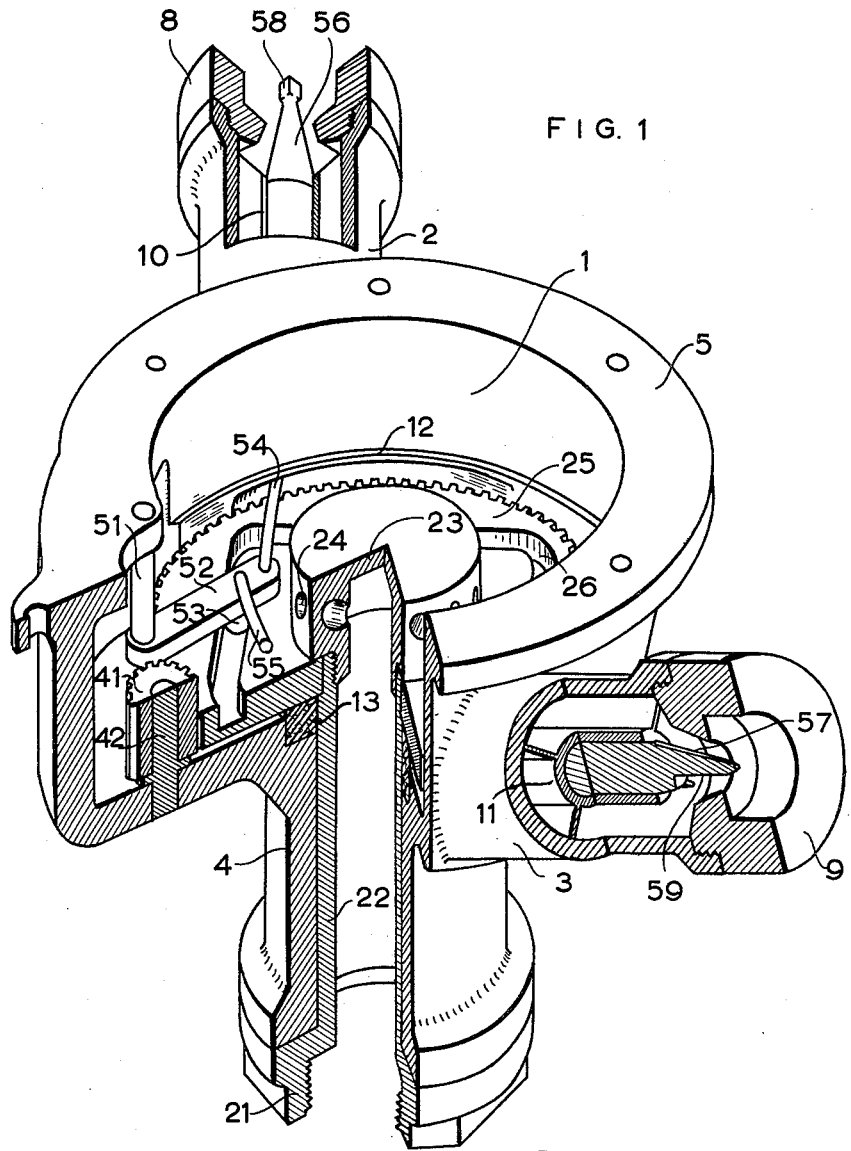

June 11, 1963     P. V. L. SALMINEN     3,093,313

TURBINE-DRIVEN IRRIGATION DEVICE

Filed Nov. 29, 1960                           2 Sheets-Sheet 1

Inventor:
Paavo Victor Ludvig Salminen
by Michael S. John
his attorney

June 11, 1963 P. V. L. SALMINEN 3,093,313
TURBINE-DRIVEN IRRIGATION DEVICE
Filed Nov. 29, 1960 2 Sheets-Sheet 2

United States Patent Office 3,093,313
Patented June 11, 1963

3,093,313
TURBINE-DRIVEN IRRIGATION DEVICE
Paavo Viktor Ludvig Salminen, Topeliuksenkatu 29B, Helsinki, Finland
Filed Nov. 29, 1960, Ser. No. 72,412
6 Claims. (Cl. 239—236)

This invention relates to a turbine-driven irrigation device comprising a stationary water inlet base member upon which is mounted a rotatable body provided with two or more advantageously adjustable discharge nozzles, the turbine consisting of a water wheel rotatably mounted in said body. The instant invention has for its object to provide an irrigation device wherein the hereinafter mentioned drawbacks in prior art devices of the stated kind are obviated. This is attained according to the invention by the provision of a gear means to drivingly connect water wheel, whose blade rim encircles a water distribution sleeve which is provided with ports and is rigidly connected to the water inlet base member, with a drive means rigidly connected to the base member and provided with a guide groove for a means for controlling the discharge area of the nozzles.

Such an irrigation device has proved to distribute water more evenly and uniformly than prior art devices. One of the reasons for this is that with prior art devices and with a proportionately scanty supply of water for irrigation purposes it is impossible to attain the desired effect because rotational speed is affected by the wind. With prior art irrigation devices it is seldom possible to maintain constant rotational speed when it is desired to vary the quantity of water during the rotation of the rotatable body and the nozzles. When the water wheel is completely housed in the rotatable body the device is insensitive to the wind and the novel arrangement that the blade rim encircles the water distribution sleeve having ports in the side walls thereof will cause the turbulence losses within the body itself to drop to the minimum, or it will operate to raise the force which imparts rotational movement to the device to a maximum, and from this it follows that the water wheel will rotate at substantially constant speed although the total quantity of water flowing through the device varies within wide ranges and despite the effect of the wind. Then too, the turbine loss of pressure will be proportionately little so that adequately high pressure is provided for throwing a relatively long jet of water.

The specific form of the stated kind of irrigation device is characterized in that the water wheel shaft is journalled in the body cover and lengthened to extend therethrough and thereabove, whereon is keyed a worm which is in meshing engagement with a worm wheel adapted to drive directly or indirectly a drive means, the pitch of the worm being such that the axial pressure created during operation in the worm shaft will be directed downwards, and that for relieving the water wheel shaft of said pressure said shaft is adapted to rest on a pin turning on the top surface of the said water distribution sleeve. Such an embodiment is advantageous as regards drive, on one hand, and even as regards commercial production, on the other hand, because for one thing this embodiment does not require any too high precision work during the manufacturing stage. The whole gear system and the water wheel are thus borne by the cover which can be mounted directly on the body member in such a way that the blade rim of the water wheel will encircle the water distribution sleeve. Moreover, the bearing for the water wheel does not require any packing, since the same may be made of water resistant material, or so that water lubricate the bearing surface and that the slight water amount which possibly leaks past the bearing surface will not cause any damage since this water will, in reality, be filtered during its passage past the bearing surface and the water may also serve as lubricant for the gearing means, i.e., worm or worm wheels or the gear system located on top of the cover. Thus the worm, worm wheels and possible toothed wheels as also the bearing bushings may advantageously be made of nylon, while the shafts may be of nylon or stainless steel. On using said materials it is possible to obtain very effective lubrication by means of pure water.

In order to ensure that the worm and the worm wheel will be protected e.g., during the assemblage or installation of the irrigation device it is advantageous to position an overload coupling between the turbine drive gearing and the actuating means.

The said water distribution sleeve is provided with ports in the side walls thereof, the size of said ports being adjusted according to the amount of water desired to be delivered; and also in order to render it possible to vary the amount of water and the size of the area being sprinkled the invention contemplates detachably mounting the water distribution sleeve in its place. Then it will be possible to change a water distribution sleeve for another one with ports differing in size from those of original sleeve and thereby vary the rotational speed of the turbine and the total water amount which is discharged.

The invention and the details thereof will appear from the following description when read in conjunction with the accompanying drawing wherein—

Figure 2:
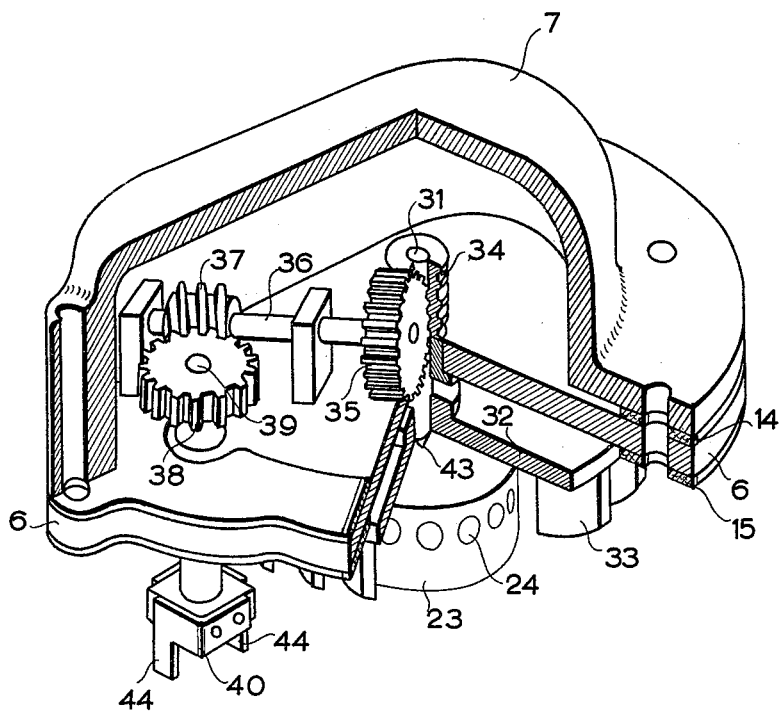

FIG. 1 and FIG. 2 respectively show the bottom part and the top part of the irrigation device embodying the invention, the said two main parts being taken apart and shown in section so that all the essential parts of the device are visible.

The irrigation device consists of a body member 1 which is provided with two sprinklers 2 and 3. The body has a pipe socket or conduit 4 near the bottom end thereof and a top flange 5 whereon is rigidly secured a cover 6 shown in FIG. 2. Upon the cover is mounted a head or top 7. The two sprinklers 2 and 3 have spray nozzles 8 and 9 at the free ends thereof and are provided with centrally located bores which advantageously may be conical. At the bottom end of a pipe section 22, a threaded flange 21 is provided by means of which the device can be coupled to a water supply pipe or conduit. The pipe section 22 is so disposed within the conduit 4 that the same is turnable in relation to the pipe secion 22. Threadably connected to the upper end of the pipe 22, and consequently replaceably mounted thereon, is a water distribution sleeve 23 which is provided with ports 24 arranged in a ring in its side wall.

Secured to the topmost end of the pipe section 22 is a toothed wheel 25 which is provided with a quadrangular guide groove 26. The cover 6 is provided with a centrally mounted shaft 31, see FIG. 2, which underneath the cover is adapted to carry a turbine or water wheel 32 having a blade rim 33 which encircles the water distribution sleeve 23.

To the shaft 31 above the cover 6 is keyed a worm 34 which meshes with a worm wheel 35 on shaft 36 provided also with a worm 37 which meshes with a second worm wheel 38 which likewise is mounted on the cover 6 by means of a shaft 39 the lower end of which carries a coupling means 40 adapted to mesh with a toothed wheel 41 mounted for free rotation about a pin 42 fastened on the inner wall of the body 1, the toothed wheel 41 being in mesh with the toothed wheel 25.

Secured to the body 1 is also an inner pin 51 whereon is turnably mounted an arm 52 the free end of which carries a pin 53 which travels in the groove 26 in the toothed wheel 25. Turnably mounted on the arm 52 are two guide rods 54 and 55 connected to cones 56 and 57 adapted to travel in guides 10 and 11 in the sprinklers 2 and 3. The cone 56 is shaped so that the same stretches out through the opening in the nozzle 8, and the cone portion which protrudes from the nozzle carries a small extension piece 58 quadratic in cross section.

On the downward turned side of the cone 57 is a groove 59 so positioned that the same will be located within the nozzle cavity when the cone is in its forward limit position but behind the said cavity when the cone is in its backward limit position.

As shown in FIG. 2, the lower end of the shaft 31 carries a pin 43 which bears against the top wall of the water distribution sleeve 23.

From the hereinabove given description it will be readily seen that the threaded end 21 and therewith also the pipe section 22, the water distribution sleeve 23 and the toothed wheel 25 are stationary when the device is threaded to a water supply pipe. The rotary movement imparted to the water wheel by the streams of water discharging through the ports 24 and impinging against the blade rim 33 is transmitted to the worm 34 and also to the worm 37 through the toothed wheel 35. Through the coupling 40 the toothed wheel 38 and the shaft 39 transmit the rotary movement to the toothed wheel 41. In this way the body 1 is caused to rotate around the fixed toothed wheel 25 and since the pin 53 travels in the guide groove 26 the arm 52 is forced to make a to-and-fro swinging movement and thereby the guide rods 54 and 55 are caused to move back and forth and to continuously change the positions of the cones 56 and 57 in accordance with the amount of irrigation desired.

The axial pressure created in the worm 34 is directed downwards which implies that this pressure can be taken up by way of the impact of pin 43 against the water distribution sleeve 23. In this way friction is reduced to an absolute minimum and from this it follows that the force imparted to the water wheel or turbine is great enough to turn the body around with constant rate of speed, uninfluenced by the wind and within truly wide ranges even uninfluenced by the water amount passing through the device.

It is evident that the water amount is controlled by the displacement of the cones so that an irrigation intensity corresponding to a rectangular irrigation pattern or area is at all times obtained, these displacements effecting a maximum opening of the cones in order to have the water reach the corners of the square to be watered and a minimum opening of the cones to water the sides of the square area to be watered. Since the two cones are controlled by the one and same arm 52 the said cones will always be in opposite positions wherefore the two sprinklers are displaced 135° in relation to each other.

As has already been described, the cone 56 serves to bring about throw of water from within the device to the outlines of a square area. When the nozzle is open to its greatest extent the farthest stratum of the spray of water will be uninfluenced by the protrusion 58 and thus the water stream reaches the corners of the square. By means of the cones 57 the spray of water is caused to tilt downwards when the cone is in its outmost limit position wherein the groove 59 gives rise to a turbulence which functions to tilt the spray downwards. Consequently this downward tilting of the water stream is effected when the nozzle is open to the smallest extent, i.e., when the very middle of the sides of a square area is being watered.

When water flows from the ports 24 out into the interior of the body 1 it will come to pass directly out through the openings which provide communication between the body interior and the discharge nozzles but in order to effect a discharge flow with minimum friction during this stage there is provided above the opening establishing communication to the discharge nozzles 2 and 3 a turbulence creating edge 12 which serves to reduce the pressure loss appreciably. Between the body 1 and the pipe 22 is positioned a packing 13 which provides a tight area between the two parts rotating relative to each other. On both sides of the cover 6 are positioned platelike packings 14 and 15 while the two shafts 31 and 39 have no packing at all since leakage of water past the bearing surface of these shafts is desirable for lubricating both the bearings and the gear system mounted upon the cover.

The high gearing employed operates to rotate the body with retarded speed such that the water amount sprayed over a given area during the first round has the possibility to penetrate into the earth and the corresponding amount of air has time to escape out of the earth before the next watering round takes place. In this way it is possible to water tracts of land most effectively without the watered area acquiring a crust.

The coupling 40 serves as a safety coupling and is provided with two resilient projections 44 which cooperate with the toothed wheel 41.

I claim:

1. A rotary sprinkling device, comprising, in combination, a supporting means; a turbine means mounted on said supporting means and including an inlet means and a rotary wheel means; a rotary body means having nozzle means and enveloping said turbine wheel means, said rotary body means being mounted on said supporting means for turning movement; first transmission means connecting said body means with said rotary wheel means so that said body means rotates when water passes through said inlet means and said rotary wheel means to said nozzle means and out of said rotary body means; nozzle control means including movable valve means in said nozzle means for controlling the flow of water through said nozzle means; and second transmission means connecting one of said rotary means with said nozzle control means for operating said valve means to vary the flow of water through said nozzle means; said valve means including a recess for downwardly deflecting the stream of water, said recess being operative when said nozzle means is at the center of one side of a substantially rectangular area sprinkled by said nozzle means.

2. A rotary sprinkling device, comprising, in combination, a supporting means; a turbine means mounted on said supporting means and including an inlet means and a rotary wheel means; a rotary body means having a pair of circumferentially spaced nozzles and enveloping said turbine wheel means, said rotary body means being mounted on said supporting means for turning movement; first transmission means connecting said body means with said rotary wheel means so that said body means rotates when water passes through said inlet means and said rotary wheel means to said nozzles and out of said rotary body means; nozzle control means including a movable valve member in each of said nozzles for controlling the flow of water through said nozzles; and second transmission means connecting one of said rotary means with said nozzle control means for operating said valve members to reduce and increase the flow of water through each nozzle in a selected rhythm; one of said valve members having a substantially square end portion, and the other of said valve members having a recess for downwardly deflecting the stream of water.

3. A rotary sprinkling device, comprising, in combination, a supporting means including a vertical inlet tube; a turbine means mounted on said supporting means and including a cap member fixed on and closing said inlet tube and having horizontal openings for distributing water flowing into said inlet tube, and a turbine wheel mounted on said supporting means for rotation about said cap member; a rotary body mounted on said inlet tube means for rotation about a vertical axis and enveloping said turbine wheel, said rotary body having two nozzles spaced in circumferential direction of said rotary body through an angle of 135° and rotating with said body in a horizontal plane; first reduction transmission means connecting said body with said turbine wheel means so that said body and said nozzles rotate when water passes through said inlet tube and said turbine wheel and out of said nozzles; said first transmission means including a pinion rotatably mounted on said rotary body and driven from said turbine wheel, and a stationary gear secured to said inlet tube in concentric relationship to the axis of rotation of said body and meshing with said pinion, said stationary gear being formed with a rectangular cam groove therein; two control valve means for controlling the flow of water through said nozzles; and second transmission means including a cam follower means rockably mounted on said body and engaging said cam groove, and connecting means connecting said cam follower means with said control valve means for operating said nozzle control valve means to vary the flow of water through said nozzles so that a rectangular area is sprinkled.

4. A sprinkling device as set forth in claim 3, wherein said first transmission means includes an overload coupling connected to said pinion.

5. A rotary sprinkling device, comprising, in combination, a supporting means; a turbine means mounted on said supporting means and including an inlet means and a rotary wheel means; a rotary body means having nozzle means and enveloping said turbine wheel means, said rotary body means being mounted on said supporting means for turning movement; first transmission means connecting said body means with said rotary wheel means so that said body means rotates when water passes through said inlet means and said rotary wheel means to said nozzle means and out of said rotary body means; nozzle control means including movable valve means in said nozzle means for controlling the flow of water through said nozzle means; and second transmission means connecting one of said rotary means with said nozzle control means for operating said valve means to vary the flow of water through said nozzle means; said valve means including deflecting means for downwardly deflecting the stream of water, said deflecting means being operative when said nozzle means is directed toward a relatively narrow portion of a predetermined area to be sprinkled.

6. A rotary sprinkling device, comprising, in combination, a supporting means including a vertical inlet tube; a turbine means mounted on said supporting means and including a cap member fixed on and closing said inlet tube and having horizontal openings for distributing water flowing into said inlet tube, and a turbine wheel mounted on said supporting means for rotation about said cap member; a rotary body mounted on said inlet tube means for rotation about a vertical axis and enveloping said turbine wheel, said rotary body having two nozzles spaced in circumferential direction of said rotary body through an angle of 135° and rotating with said body in a horizontal plane; first reduction transmission means connecting said body with said turbine wheel means so that said body and said nozzles rotate when water passes through said inlet tube and said turbine wheel and out of said nozzles; said first transmission means including a pinion rotatably mounted on said rotary body and driven from said turbine wheel, and a stationary gear secured to said inlet tube in concentric relationship to the axis of rotation of said body and meshing with said pinion, said stationary gear being formed with cam means corresponding in contour to the shape of a predetermined area to be sprinkled; two control valve means for controlling the flow of water through said nozzles; and second transmission means including a cam follower means rockably mounted on said body and engaging said cam means, and connecting means connecting said cam follower means with said control valve means for operating said control valve means to vary the flow of water through said nozzles so that said predetermined area will be sprinkled.

References Cited in the file of this patent

UNITED STATES PATENTS

| | | |
|---|---|---|
| 691,419 | Vandervoort | Jan. 21, 1902 |
| 2,621,967 | Sorenson | Dec. 16, 1952 |
| 2,962,220 | Woods | Nov. 29, 1960 |
| 2,999,643 | Kennedy | Sept. 12, 1961 |

FOREIGN PATENTS

| | | |
|---|---|---|
| 93,509 | Norway | Mar. 9, 1959 |